United States Patent [19]

Edwards

[11] 4,001,525
[45] Jan. 4, 1977

[54] ARRANGEMENT FOR TESTING TELECOMMUNICATION REPEATERS

[75] Inventor: Allan Kendrick Edwards, Harlow, England

[73] Assignee: International Standard Electric Corporation, New York, N.Y.

[22] Filed: Oct. 21, 1975

[21] Appl. No.: 624,507

[30] Foreign Application Priority Data

Dec. 3, 1974 United Kingdom ............ 52248/74

[52] U.S. Cl. ..................................... 179/175.31 R
[51] Int. Cl.² ............................................... H04B 1/60
[58] Field of Search .......... 179/175.31 R, 175.3 R, 179/170 F, 15 BF; 178/69 A, 69 N; 324/57 N

[56] References Cited
UNITED STATES PATENTS

| | | |
|---|---|---|
| 3,678,222 | 7/1972 | Boehly .................... 179/175.31 R |
| 3,731,011 | 5/1973 | Lachaise ................... 179/175.31 R |
| 3,737,584 | 6/1973 | Kaneko et al. ........... 179/175.31 R |
| 3,870,838 | 3/1975 | Corwin et al. ............ 179/175.31 R |
| 3,906,174 | 9/1975 | Dotter ....................... 179/175.3 R |
| 3,917,916 | 11/1975 | Ghosh et al. .............. 179/175.31 R |

Primary Examiner—Douglas W. Olms
Attorney, Agent, or Firm—John T. O'Halloran; Alfred C. Hill

[57] ABSTRACT

A repeater connected in a telecommunication line receiving a pseudorandom digital signal from the line is tested in-line by superimposing a noise signal of steadily increasing amplitude on the digital signal and measuring the amplitude of the noise signal at an output of the source of the noise signal when the amplitude of the noise signals produces a predetermined number of errors in the digital signal at the output of the repeater.

18 Claims, 4 Drawing Figures

ARRANGEMENT FOR TESTING TELECOMMUNICATION REPEATERS

BACKGROUND OF THE INVENTION

This invention relates to arrangements for testing and facilitating adjustment of telecommunication repeaters of the medium speed digital line regenerator type and in particular to an arrangement for testing a repeater installed in a telephone line.

Digital regenerators or repeaters are employed in digital transmission systems to receive, amplify and reshape the pulses of the code being transmitted. Generally such transmission systems employ a ternary code, i.e. the information is coded into a series of positive and negative going pulses. The regenerator receives the attenuated pulse code signals from the line, filters out noise and other spurious signals and generates a stream of pulses at its output to recover the original code transmission. Such regenerators require testing to ensure correct operation, e.g. the repeater must not miss pulses of the input code, nor must it generates spurious pulses.

The ternary pulse codes used with digital transmission are generally of the pseudo-random type. Over a sufficiently long interval there are equal numbers of positive and negative going pulses. Furthermore, even over a short interval there is, depending on the particular code employed, a maximum possible disparity between positive and negative going pulses. Incorrect operation of the repeater will thus result in a disparity between positive and negative pulses beyond these limits.

A suitable digital code which may be used for such transmission is the 4B3T code described in U.S. Pat. Nos. 3,611,141 and 3,646,517 whose disclosures are incorporated herein by reference. The disparity between positive and negative pulses of this code, which provides a method of encoding four-bit binary words into three-bit ternary words, cannot exceed four for correct operation. Other codes which may also be employed, for example, an alternate mark inversion code having a maximum cummulative disparity of one, or a triple ternary code having a maximum cummulative disparity of three.

SUMMARY OF THE INVENTION

An object of the present invention is the provision of an arrangement for in-line testing of a telecommunication repeater of the digital regenerator type.

A feature of the present invention is to provide an arrangement for in-line testing of a telecommunication repeater of the digital regenerator type comprising: a transmission line for transmitting a digital signal; a repeater under test coupled into the transmission line to regenerate the digital signal; a noise generator to generate a noise signal of steadily increasing amplitude; an impedance transformer coupled to the noise generator and the input of the repeater to superimpose the noise signal on the digital signal; an error detector coupled to the output of the repeater to produce an error output signal when the amplitude of the noise signal has increased until errors are produced in the digital signal at the output of the repeater; and first means coupled to the output of the error detector and the noise generator, the first means being responsive to the error output signal for sampling and measuring the voltage amplitude of a signal in the noise generator and to reset the noise generator to zero.

Another feature of the present invention is to provide a method of in-line testing of a telecommunication repeater of the digital regenerator type comprising the steps of feeding a pseudo-random digital signal to the repeater input from a telecommunication line; superimposing a noise signal of steadily increasing amplitude on the digital signal; and measuring the amplitude of the noise signal at the incidence of maximum signal disparity at the output of the repeater.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
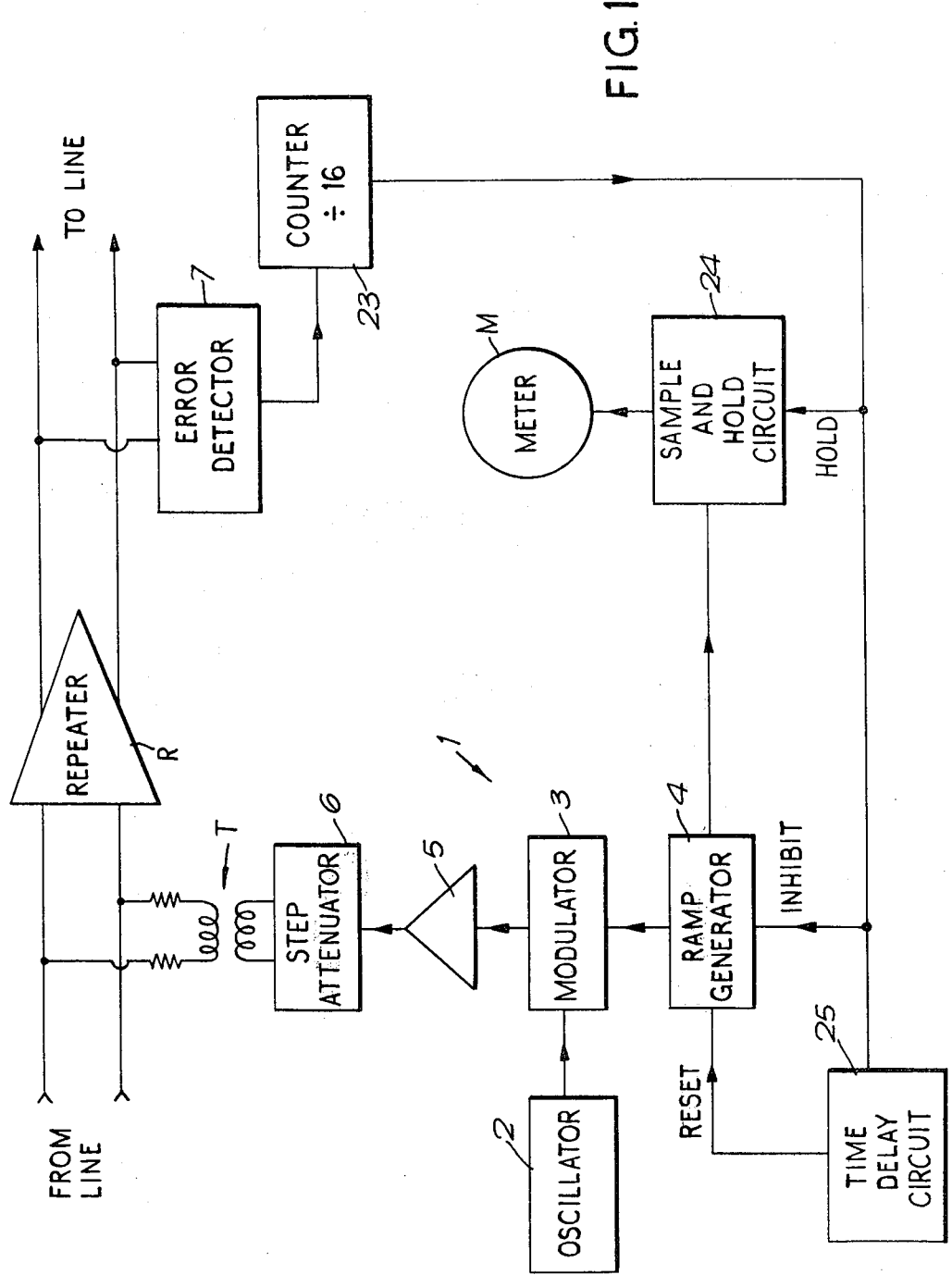
FIG. 1 is a block diagram of a repeater test arrangement in accordance with the principles of the present invention connected to a repeater in a telephone line.
Figure 2:
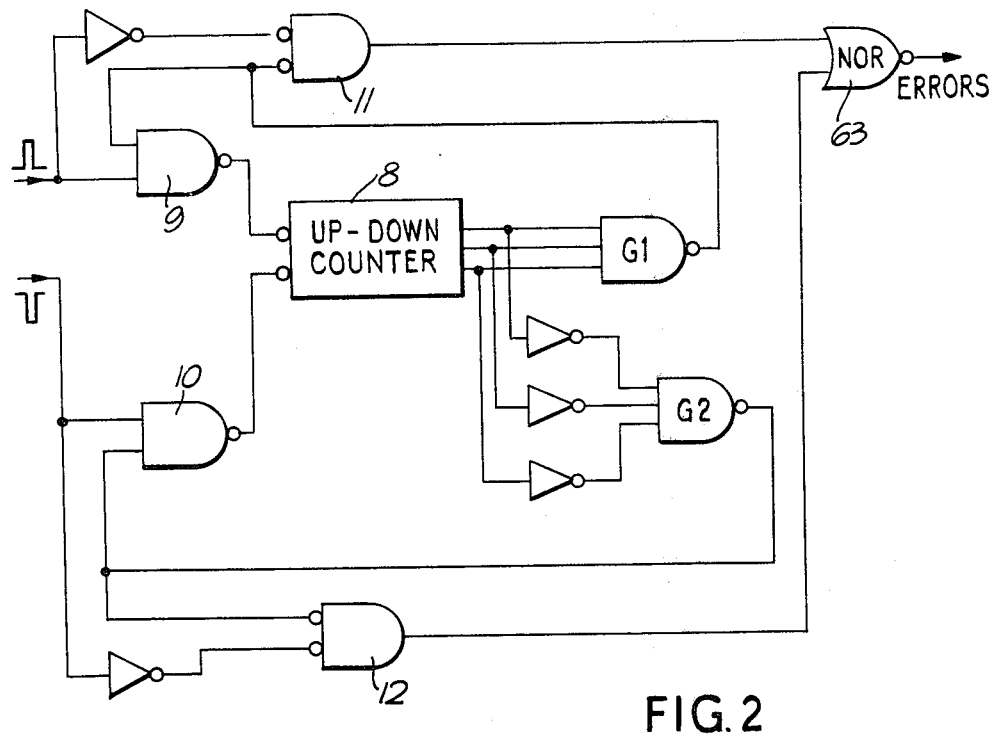
FIG. 2 is a block circuit diagram of an error detector employed in the circuit arrangement of FIG. 1 when a 4B3T code is in use.

Referring to FIGS. 1 and 2, the arrangement is connected to the input and output terminals of a repeater R under test. The arrangement comprises a noise generator 1 including an oscillator 2 whose output is mixed in a modulator 3 with a saw-tooth or ramp waveform from ramp generator 4 to provide a signal of steadily increasing amplitude. The modulated signal is then fed via a fixed gain amplifier and a step attenuator to a transformer T coupled to the input of the repeater R. The step attenuation provides several ranges of output level to repeater R, and transformer T ensures that a high impedance is presented to the input of repeater R. The noise signal at the input of repeater R is thus superimposed on the pulse code signal that the repeater receives from the line.

The output of the repeater is fed to an error detector 7 which examines the parity of the output signal and generates an error signal whenever excessive disparity of the output signal occurs. If the transmission system is operating on the 4B3T code, a maximum of only four disparities between positive and negative going pulses can occur. Thus, a total of more than four disparities indicates an error or fault condition.

As shown in FIG. 2, the input to the error detector circuit is divided into two streams, one of positive and the other of negative going pulses. The pulses of each stream are counted in a four bit up-down counter 8, which may advantageously be of the SN74193 TTL type. The pulses of each stream are coupled to counter 8 via NAND gates 9 and 10 connected as illustrated to AND gates G1 and G2. Counter 8 generates an output pulse to NAND gates G1 and G2 whenever the accumulated total of disparities reaches four. If further disparity occurs, a disparity exceeding four, the corresponding gate G1 or G2 produces an output error signal from NOR gate G3 via NAND gates 11 and 12 connected as illustrated.

Figure 3:
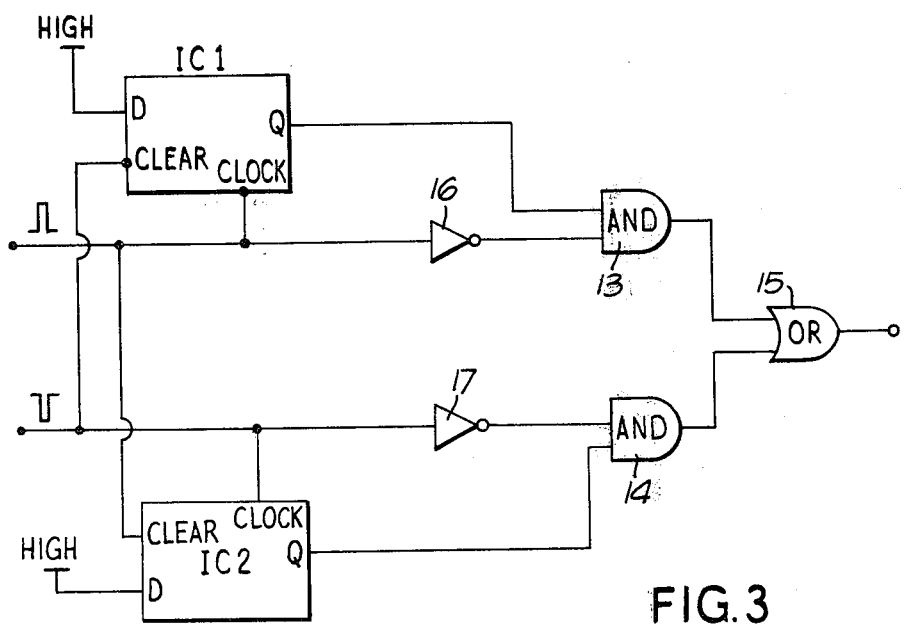
FIGS. 3 and 4 are block circuit diagrams of error detectors for use with the arrangement of FIG. 1 when other line codes are employed.
Figure 4:
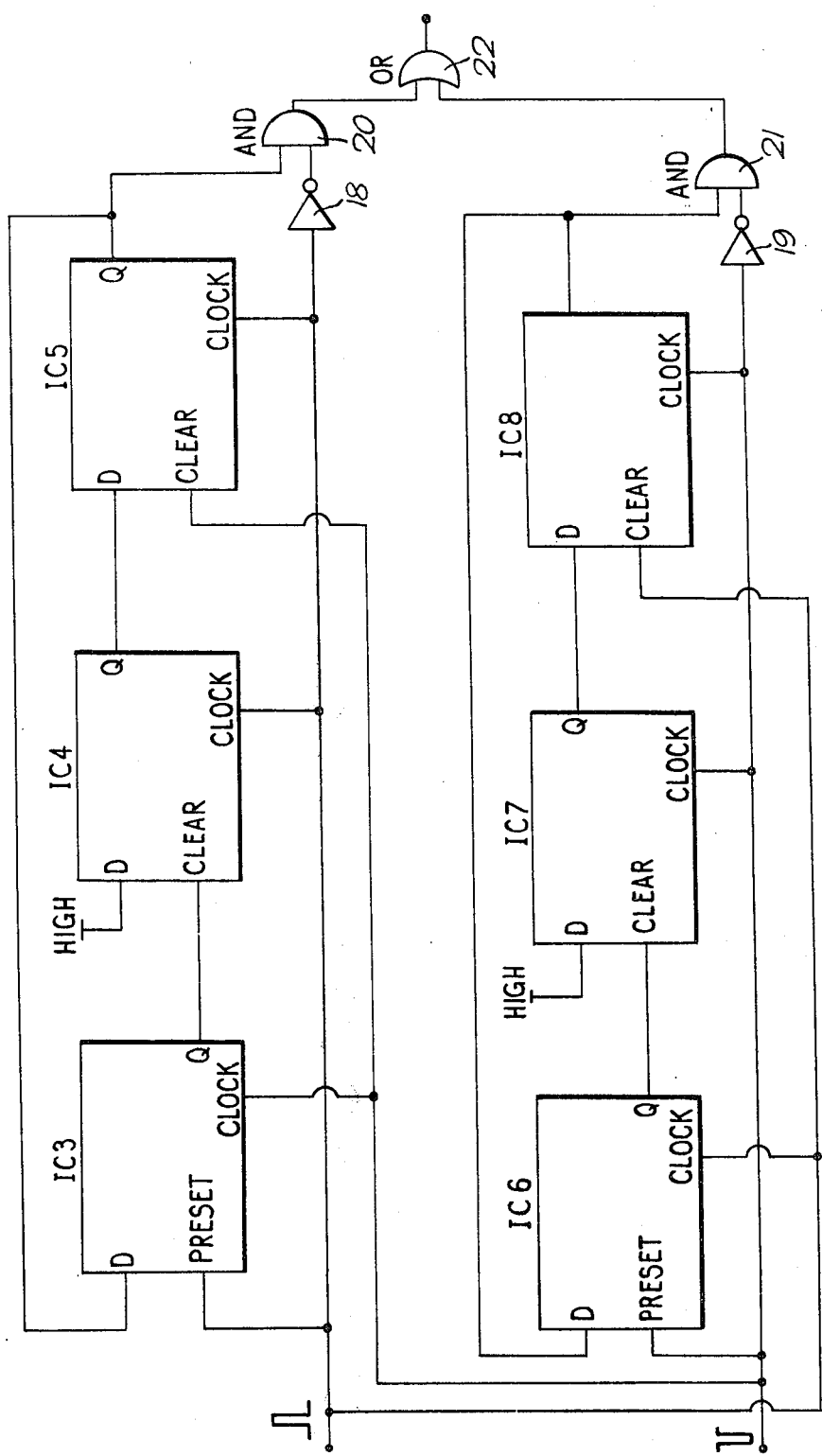

The circuits shown in FIGS. 3 and 4 operate in a similar manner, but are designed for systems in which the maximum disparity is one and two, respectively. The circuits IC1 – TC8 are all dual D flip-flops and may advantageously be of the type SN7474. The output error signal of FIG. 3 for a maximum disparity of one is produced by AND gates 13 and 14 and OR gate 15 connected as illustrated to D flip-flops IC1 and IC2 and inverters 16 and 17. The output error signal of FIG. 4 for a maximum disparity of two is produced by D flip-flops IC3 to IC8, inverters 18 and 19, AND gates 20 and 21 and OR gate 22 connected as illustrated.

Referring again to FIG. 1 the output error signal from error detector 7 is fed to a divide by 16 counter 23 which simply counts errors until 16 have been accumulated. At this time counter 23 generates an output pulse which is coupled to the sample and hold circuit 24 and to ramp generator 4.

The output pulse from counter 23 causes ramp generator 4 to be held and, after a suitable time delay provided by time delay circuit 25, to be reset. After a further time delay during which the repeater resumes normal error free operation ramp generator 4 is again started and the process is repeated. Since the noise threshold in a correctly functioning repeater is generally sharp, ramp generator 4 is repeatedly held at approximately the same point. The output waveform from ramp generator 4 may therefore be smoothed in sample and hold circuit 24 to operate a meter M which provides an indication of noise amplitude threshold at which incorrect operation of repeater R occurs. The repeater equalization may then be adjusted to obtain the condition in which repeater R operates at its optimum point for a noisy environment, such as crosstalk.

A sine wave oscillator modulated by a comparatively low frequency ramp is a suitable noise source and does not cause excessive interaction of the test signal with the automatic line build out, which is a common design in digital repeaters. Incorrect adjustment of repeater R could occur if the interaction of the test signal were to be excessive. Such interaction can be caused by use of a steady sine wave.

The test arrangement described herein is for use with repeaters in which the time signal is scrambled before transmission so that an idle channel carries a pseudo-random signal. Thus, no pattern generator is required at the terminal. With minor circuit changes the arrangement can be modified to operate on other p.c.m. line regenerators, such as the European 1.536 Mb or 2.048 Mb systems, or the American 1.544 Mb system. The changes are implemented only in the error detection circuitry to accommodate the different line codes employed.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement for in-line testing of a telecommunication repeater of the digital regenerator type comprising:
    a transmission line for transmitting a digital signal;
    a repeater under test coupled into said transmission line to regenerate said digital signal;
    a noise generator to generate a noise signal of steadily increasing amplitude;
    an impedance transformer coupled to said noise generator and the input of said repeater to superimpose said noise signal on said digital signal;
    an error detector coupled to the output of said repeater to produce an error output signal when the amplitude of said noise signal has increased until errors are produced in said digital signal at the output of said repeater; and
    first means coupled to the output of said error detector and said noise generator, said first means being responsive to said error output signal for sampling and measuring the voltage amplitude of a signal in said noise generator and to reset said noise generator to zero.

2. An arrangement according to claim 1, wherein said noise generator includes
    an oscillator,
    a ramp generator, and
    a modulator coupled to said oscillator and said ramp generator to modulate an output signal from said oscillator by a ramp waveform at the output of said ramp generator.

3. An arrangement according to claim 2, wherein said oscillator produces a sine wave signal,
    said ramp generator generates a comparatively low frequency ramp waveform, and
    said modulator modulates said sine wave signal by said low frequency ramp waveform.

4. An arrangement according to claim 3, wherein said first means is coupled to said ramp generator to sample and measure the voltage amplitude of said low frequency ramp waveform and to reset said ramp generator to zero.

5. An arrangement according to claim 4, wherein said first means includes
    a sample and hold circuit coupled to the output of said error detector and an output of said ramp generator,
    a meter coupled to said sample and hold circuit to indicate the voltage amplitude of said low frequency ramp waveform which produced said error output signal, and
    a time delay circuit coupled to the output of said error detector and said ramp generator to delay the resetting of said ramp generator a predetermined length of time after said error output signal is produced.

6. An arrangement according to claim 5, wherein said error detector includes
    a second means coupled to the output of said repeater to divide the output signal of said repeater into a first stream of positive pulses and a second stream,
    third means coupled to said second means to measure the disparity between said first and second streams, and
    an up-down counter coupled to said third means to accumulate the total number of disparities.

7. An arrangement according to claim 6, wherein said digital signal is a 4B3T code having a maximum disparity of four, and
    said up-down counter is a four bit up-down counter which generates said error output signal when five disparities are accumulated.

8. An arrangement according to claim 2, wherein said first means is coupled to said ramp generator to sample and measure the voltage amplitude of a ramp waveform and to reset said ramp generator to zero.

9. An arrangement according to claim 8, wherein said first means includes
a sample and hold circuit coupled to the output of said error detector and an output of said ramp generator,
a meter coupled to said sample and hold circuit to indicate the voltage amplitude of a ramp waveform which produced said error output signal, and
a time delay circuit coupled to the output of said error detector and said ramp generator to delay the resetting of said ramp generator a predetermined length of time after said error output signal is produced.

10. An arrangement according to claim 9, wherein said error detector includes
a second means coupled to the output of said repeater to divide the output signal of said repeater into a first stream of positive pulses and a second stream,
third means coupled to said second means to measure the diparity between said first and second streams, and
an up-down counter coupled to said third means to accumulate the total number of disparities.

11. An arrangement according to claim 10, wherein said digital signal is a 4B3T code having a maximum disparity of four, and
said up-down counter is a four bit up-down counter which generates said error output signal when five disparities are accumulated.

12. An arrangement according to claim 1, wherein said first means includes
a sample and hold circuit coupled to the output of said error detector and said noise generator,
a meter coupled to said sample and hold circuit to indicate the voltage amplitude of a signal in said noise generator when said error output signal is produced, and
a time delay circuit coupled to the output of said error detector and said noise generator to delay the resetting of said noise generator a predetermined length of time after said error output signal is produced.

13. An arrangement according to claim 12, wherein said error detector includes
a second means coupled to the output of said repeater to divide the output signal of said repeater into a first stream of positive pulses and a second stream,
third means coupled to said second means to measure the disparity between said first and second streams, and
an up-down counter coupled to said third means to accumulate the total number of disparities.

14. An arrangement according to claim 13, wherein said digital signal is a 4B3T code having a maximum disparity of four, and
said up-down counter is a four bit up-down counter which generates said error output signal when five disparities are accumulated.

15. An arrangement according to claim 1, wherein said error detector includes
a second means coupled to the output of said repeater to divide the output signal of said repeater into a first stream of positive pulses and a second stream,
third means coupled to said second means to measure the disparity between said first and second streams, and
an up-down counter coupled to said third means to accumulate the total number of disparities.

16. An arrangement according to claim 15, wherein said digital signal is a 4B3T code having a maximum disparity of four, and
said up-down counter is a four bit up-down counter which generates said error output signal when five disparities are accumulated.

17. A method of in-line testing of a telecommunication repeater of the digital regenerator type comprising the steps of
feeding a pseudo-random digital signal to said repeater input from a telecommunication line;
superimposing a noise signal of steadily increasing amplitude on said digital signal, said noise signal being provided by a noise signal source; and
measuring the amplitude of said noise signal at an output of said source when the amplitude of said noise signal produces a predetermined number of errors in said digital signal at the output of said repeater.

18. A method according to claim 17, further including the step of
adjusting said repeater to obtain a condition in which said repeater will operate at its optimum in a noisy environment.

* * * * *